(12) United States Patent
Kulkarni et al.

(10) Patent No.: US 7,802,398 B2
(45) Date of Patent: Sep. 28, 2010

(54) MOSQUITO CONTROL DEVICE

(75) Inventors: Arun Kulkarni, Brantford (CA); Leonardo Aldana, Brantford (CA)

(73) Assignee: Koolatron Corporation, Brantford, ON (CA)

( * ) Notice: Subject to any disclaimer, the term of this patent is extended or adjusted under 35 U.S.C. 154(b) by 483 days.

(21) Appl. No.: 11/263,767

(22) Filed: Nov. 2, 2005

(65) Prior Publication Data

US 2006/0156618 A1 Jul. 20, 2006

Related U.S. Application Data

(60) Provisional application No. 60/644,704, filed on Jan. 17, 2005.

(51) Int. Cl.
*A01M 1/06* (2006.01)
*A01M 5/08* (2006.01)

(52) U.S. Cl. ........................ 43/139; 43/132.1

(58) Field of Classification Search .................. 43/107, 43/122, 124, 125, 129, 132.1, 133, 139
See application file for complete search history.

(56) References Cited

U.S. PATENT DOCUMENTS

| 4,519,776 | A | 5/1985 | DeYoreo et al. |
|---|---|---|---|
| 5,647,164 | A | 7/1997 | Yates |
| 5,669,176 | A | 9/1997 | Miller |
| 5,799,436 | A | 9/1998 | Nolen et al. |
| 5,813,166 | A * | 9/1998 | Wigton et al. .................. 43/107 |
| 6,145,243 | A | 11/2000 | Wigton et al. |
| 6,286,249 | B1 | 9/2001 | Miller et al. |
| 6,662,489 | B2 * | 12/2003 | Spiro et al. .................... 43/107 |
| 6,718,685 | B2 | 4/2004 | Bossler |
| 2002/0129540 | A1 | 9/2002 | Chura |
| 2003/0070346 | A1 | 4/2003 | Winner et al. |
| 2004/0123512 | A1 | 7/2004 | Spiro et al. |
| 2004/0139648 | A1 | 7/2004 | Durand et al. |
| 2004/0237382 | A1 | 12/2004 | Durand et al. |
| 2005/0274061 | A1 * | 12/2005 | Zhu ............................ 43/139 |

* cited by examiner

*Primary Examiner*—David J Parsley
(74) *Attorney, Agent, or Firm*—Richard John Bartz

(57) ABSTRACT

A mosquito control device has a mosquito attracting and obliterating unit coupled to a heat-generating unit operable to supply heated $CO_2$ and moisture to the mosquito attracting and obliterating unit. The device uses a combination of female mosquito attractants that incite mosquitoes hunting instincts including $CO_2$, moisture, static thermal imaging, dynamic thermal imaging, spot thermal imaging and special lights. Once the mosquitoes are attracted, the device uses vacuum air to suck mosquitoes into a receptacle designed to keep and maintain the mosquitoes until they dehydrate and eventually die.

24 Claims, 4 Drawing Sheets

MOSQUITO CONTROL DEVICE

CROSS REFERENCE TO RELATED APPLICATION

This application claims the benefit of U.S. Provisional Application Ser. No. 60/644,704 filed Jan. 17, 2005.

FIELD OF THE INVENTION

The invention is a mosquito control device that utilizes heat, carbon dioxide and air flow to attract and obliterate mosquitoes.

BACKGROUND OF THE INVENTION

Known devices for obliterating insects including mosquitoes have electrified grids and lights to attract insects to fly through the grids which zaps the insects. Other insect traps use carbon dioxide as an insect attractant. Carbon dioxide mimics the biological functions of humans and animals which are sensed by the insects. The following U.S. Patents relate to insects traps using carbon dioxide as an insect attractant and suction-type insect traps.

S. G. DEYOREN and D. P. STEVENS in U.S. Pat. No. 4,519,776 discloses the use of ultraviolet light and a generator to produce carbon dioxide, heat and moisture to attract mosquitoes. The generator combusts a gaseous fuel in air in an exothermic reaction which is sustained catalytically to produce carbon dioxide, heat and moisture. A conventional insect trapping device having an ultraviolet light source and an electrically charged grid accommodates the carbon dioxide, heat and moisture which attracts mosquitoes to the trapping device.

M. H. MILLER in U.S. Pat. No. 5,669,176 discloses an insect trap having a methanol fuel cell to provide carbon dioxide, water vapor and heat as insect attractive agents. Electricity generated by the fuel cell provides power to electrical components, such as a fan for creating air flow through the trap. A mesh bag at the outlet end of the trap collects the insects drawn into the trap.

J. A. NOLEN and W. MALLOW in U.S. Pat. No. 5,799,436 discloses an apparatus for attracting and destroying insects, such as mosquitoes, which utilizes carbon dioxide, octenol and a heat source. An electric grid destroys the insects attracted by the carbon dioxide, octenol and heat.

B. E. WIGTON and M. H. MILLER in U.S. Pat. No. 6,145,243 discloses an insect trap catalytic conversion of hydrocarbon fuel in a combustion chamber. A thermoelectric generator coupled to the combustion chamber provide power for fans creating an exhaust gas flow and air suction flow in concentric intake and exhaust tubes. The insects are captured in a porous and disposable bag connected to the air discharge end of exhaust tube.

M. H. MILLER, B. E. WIGTON, and K. LONNEGREN in U.S. Pat. No. 6,286,249 discloses a suction insect trap for attracting, and disabling insects. The trap has an air flow mechanism that provides inflow air that encircles counter moving outflow air. The outflow air attracts insects and the inflow air urges the insects to enter the trap. The insects are captured in a mesh bag, located in the outflow air passage. A fan within the central channel of the trap creates a flow of air through the trap carrying insects into the mesh bag. Disabling mechanisms such as an electric grid, lights, and insect attractants are useable with the insect trap.

M. C. BOSSLER in U.S. Pat. No. 6,718,685 discloses a suction-type insect trap having a housing with air inlets and outlets. A fan operates to move air through the trap. Carbon dioxide gas directed to an outlet attracts insects to the trap. The insects are caught in a trap cup disposal between the inlet and fan.

SUMMARY OF THE INVENTION

The invention is a device for controlling mosquito populations in selected outdoor environments, such as decks, porches, patios and yards. The device has a heat generating unit operable to supply heated air, moisture and $CO_2$ to a mosquito attracting and obliterating unit. The heat generating unit has a housing enclosing a gas burner, such as a propane gas burner. The combustion of the gas from the burner generates hot $CO_2$ and moisture which flows under a shroud to the mosquito attracting and obliterating unit. The heat generated by the burner warms up specific areas of the shroud to establish static thermal imaging. The flow of warm $CO_2$ and moisture laterally away from the unit forms a $CO_2$ cloud in the environment around the unit that attracts mosquitoes and other air borne insects. The $CO_2$ and moisture cooled by the ambient temperature descends. A fan through the unit pushes the $CO_2$ cloud and moisture away from the unit in a swirl flow distribution of $CO_2$ and moisture. The $CO_2$ and moisture are sensed by mosquitoes. A series of electric heaters are located adjacent and underneath separate surfaces of an external housing, such as a dome, of the unit to simulate warm spots of a living body. The dome has warm and cool areas identified as spot thermal imaging. The series of electric heaters are interconnected to turn on and off at a living body's similar temperature, which is identified as dynamic thermal imaging. The fan also operates to create vacuum airflow movement that sucks mosquitoes into the device under a cover over the housing and moves the air entrained mosquitoes into a mosquito collecting receptacle where they dehydrate and die.

DETAILED DESCRIPTION OF THE INVENTION

Figure 1:
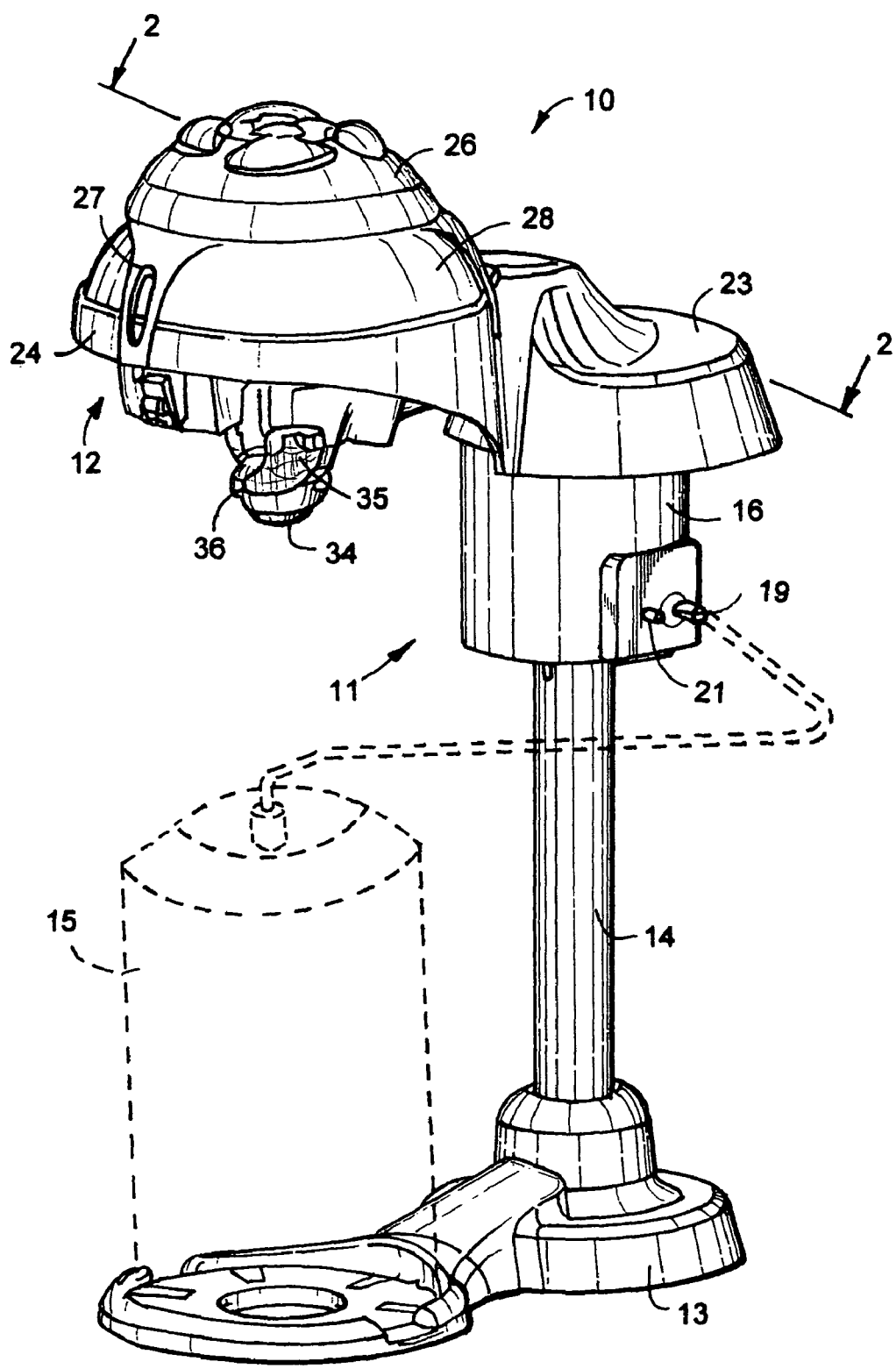
FIG. 1 is a perspective view of the mosquito control device of the invention.

The mosquito control device 10, shown in FIG. 1, has a heat generating unit 11 and a mosquito attracting and obliterating unit 12. Base 13 has a generally circular extension for supporting a propane fuel tank 15. A base 13 and upright post 14 hold units 11 and 12 on a fixed support, such as a deck, patio, or ground in an outdoor environment harboring air borne insects, such as female mosquitoes. Mosquito control device 10 uses a combination of female mosquito attractants that incite their hunting instincts. These attractants include moisture, $CO_2$, octenol, static thermal imaging, dynamic thermal imaging, spot thermal imaging and special lights. The mosquitoes are captured and deposited in a receptacle 34 with moving air established by swirl air flow patterns.

Figure 2:
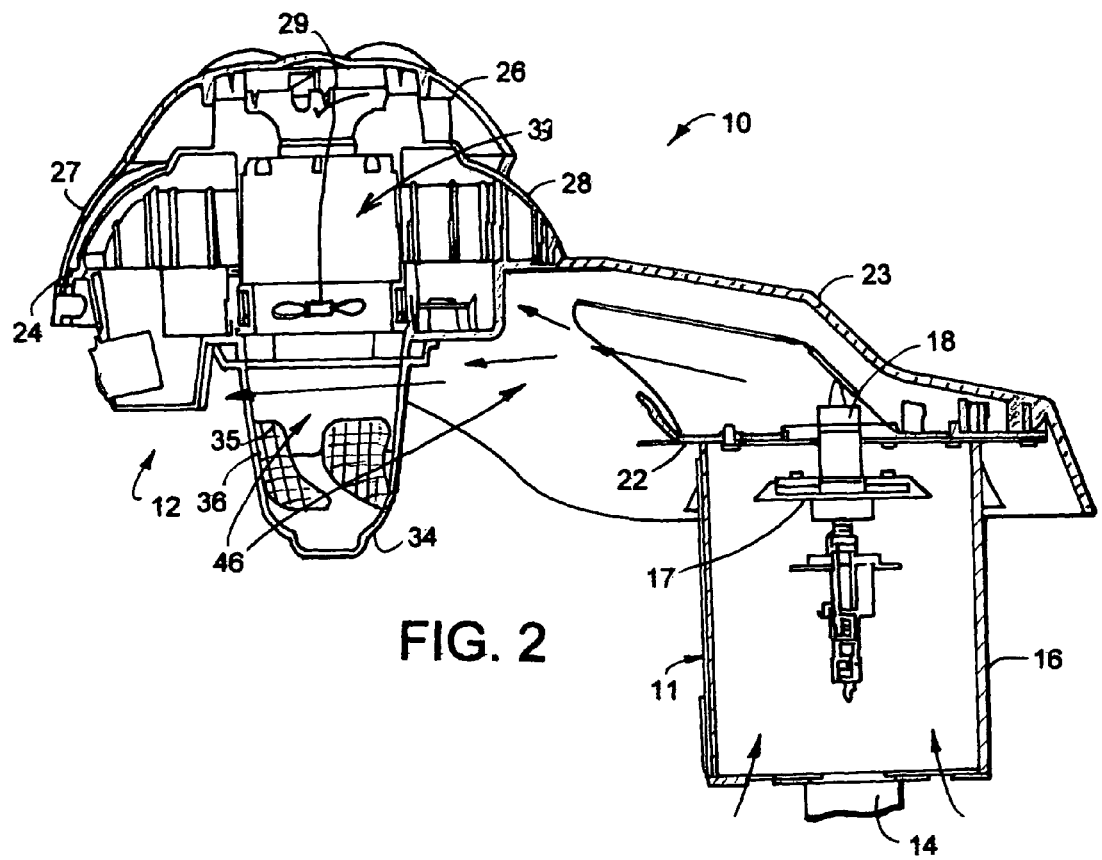
FIG. 2 is an enlarged sectional view taken along the line 2-2 of FIG. 1 showing the flow of $CO_2$ and moisture through the mosquito control device.
Figure 3:
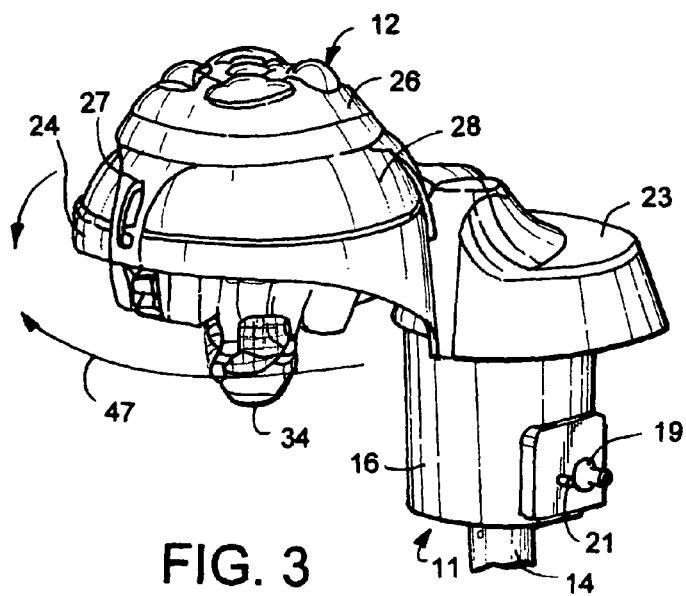
FIG. 3 is a perspective view of the mosquito control device illustrating a $CO_2$ cloud around the mosquito control device.

Heat generating unit 11, shown in FIGS. 1 to 3, has a cylindrical housing 16 mounted on top of post 14. A burner 17, such as a propane burner, located in housing 16 generates a flame in a tubular nozzle 18 which directs the flame and heated $CO_2$ upwardly into mosquito attracting and obliterating unit 12. Fuel, such as propane gas in tank 15, is supplied to burner 17 via a tubular connector 19 mounted on housing 16. Burner 17 has an igniter having a manual actuator 21 operable to generate a spark for igniting the propane gas in burner 17. Housing 16 is secured to a base plate 22 of unit 12.

Figure 4:
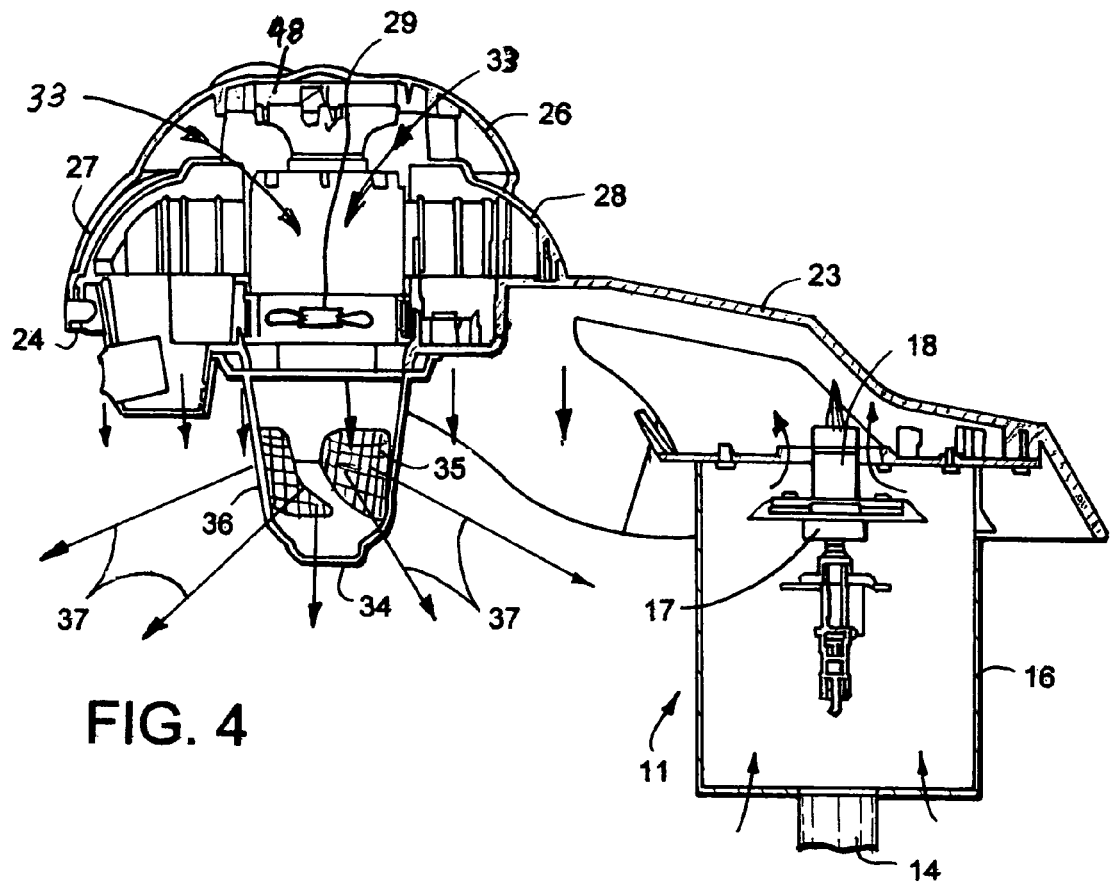
FIG. 4 is a sectional view similar to FIG. 2 showing the $CO_2$ and moisture that when they cool down are descending because of being heavier than air and being pushed away from the mosquito control device.
Figure 7:
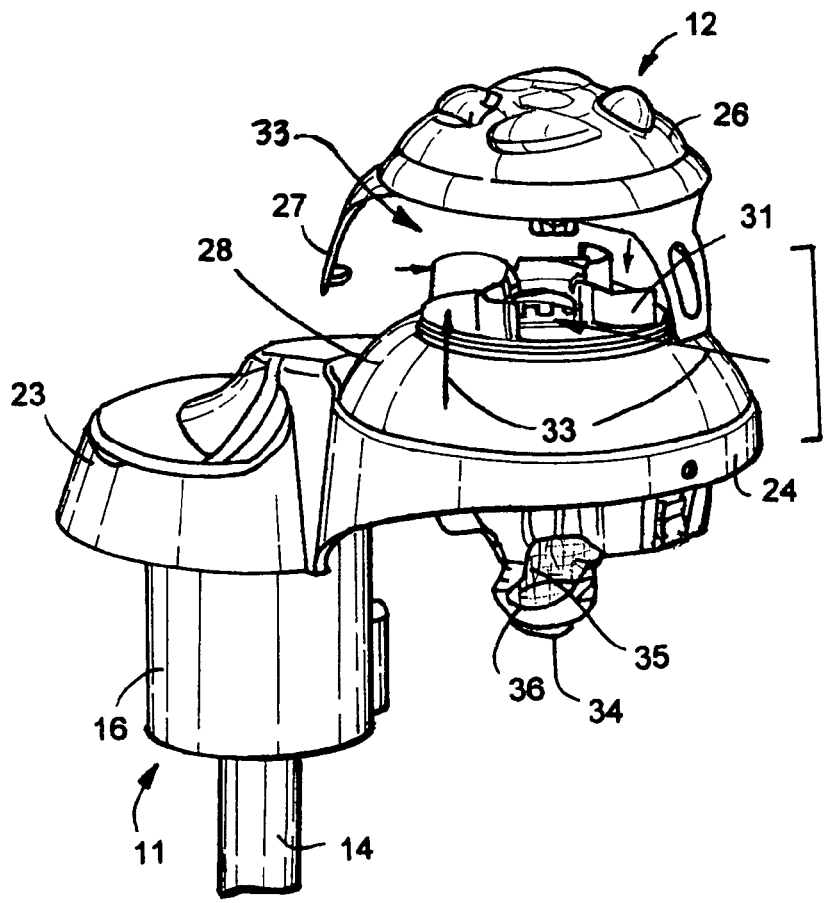
FIG. 7 is an exploded perspective view of the mosquito control devices of FIG. 1 uncovering interior of the unit, where the construction of the ribs to cause swirl airflow is shown.

Mosquito attracting and obliterating unit 12 has a shroud 23 located over burner 17 secured to base plate 22. Shroud 23 has a designed inverted generally U-shape that helps direct the hot airflow up and towards the other elements of the unit, warming up constantly some of it's surfaces. This is called a static thermal imaging. It has an open bottom joined to a cylindrical member 24. A cover or cap 26 having downwardly directed legs 27 is mounted on cylindrical member 24. Cap 26 covers a housing 28 that in this case is dome-shaped or semi-hemispherical. As shown in FIG. 7, the housing 28 has the static ribs 31 that in this case are curved shaped to create a swirl airflow 33 as the air is sucked by an interior fan 29 into the unit. Fan 29, shown in FIGS. 2 and 4, driven with an electric motor generates a vacuum causing a flow of air shown by arrows 33 towards the center of unit 12 to suck mosquitoes into unit 12. Special lights 48 shown in FIG. 2 underneath the cover 26, such as blue lights attract the mosquitoes even closer to the vacuum area of the trap. As shown in FIG. 4, air flows down through a receptacle 34 having side openings 36, which are covered by a mesh 35 to avoid mosquitoes from escaping and that direct air and $CO_2$ in a swirl motion away from unit 12, shown by arrows 37, toward the field in order to send an homogeneous and consistent signal to mosquitoes in the surrounding environment. This is a swirl flow distribution of $CO_2$ and moisture.

Figure 5:
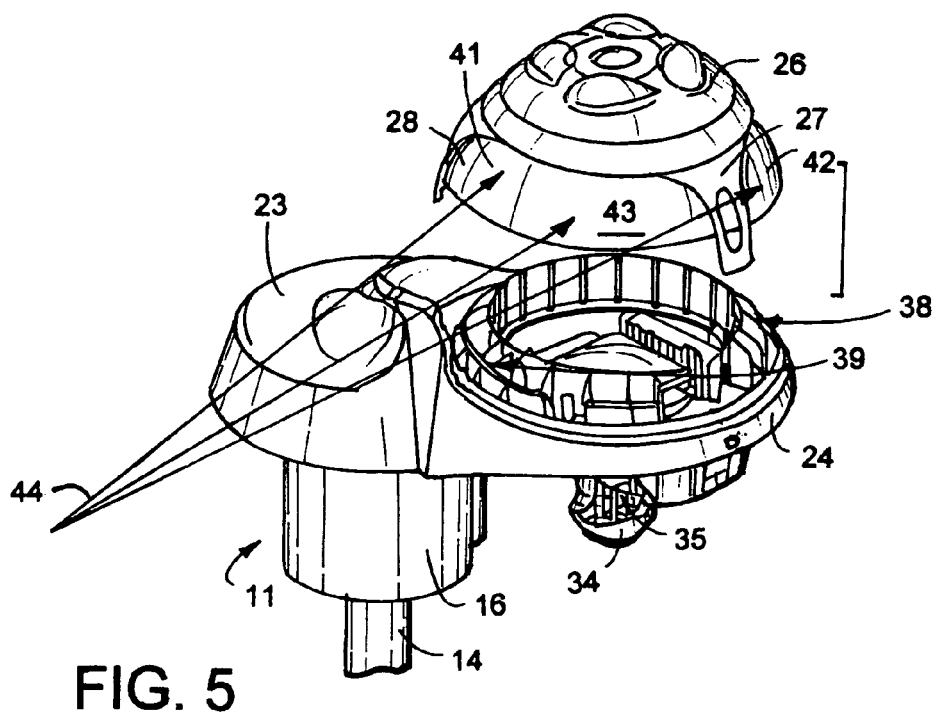
FIG. 5 is an exploded perspective view of the mosquito control device of FIG. 1 having a series of electric heaters for applying heat energy to specific surfaces of the mosquito control device.
Figure 6:
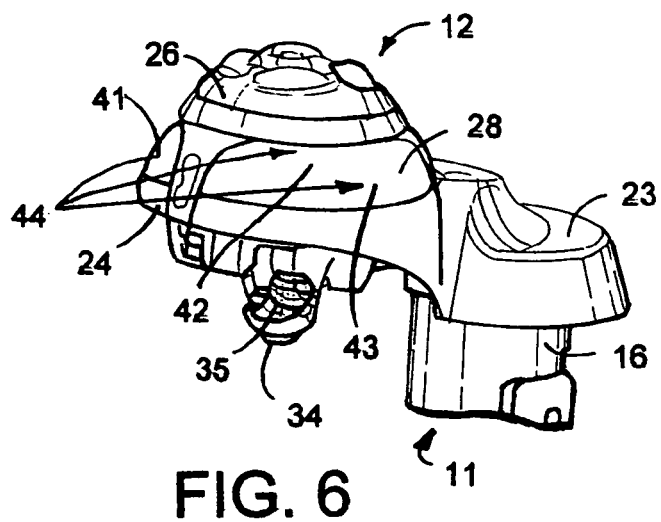
FIG. 6 is a perspective view of the mosquito control device of FIG. 5 illustrating the heated surfaces of the mosquito control device.

As shown in FIG. 5, electric heaters 38 and 39 mounted on member 24 are circumferentially spaced from each other to establish multiple thermal imaging spots or areas represented by numbers 41, 42 and 43 on the surface of dome-shaped housing 28. These spot thermal imaging simulates warmer spots on living being's bodies that correspond to blood streams running closer to the surface of the skin, signaling mosquitoes of areas where they can extract easier the food they are looking for. The thermal imaging spots, shown by arrows 44 in FIGS. 5 and 6 are generated by a series of heaters 38 and 39 interconnected in such a way that the heaters 38 and 39 turn on and off at living being's or human's similar temperatures to simulate dynamic thermal imaging, which is intended to incite the hunting instincts of mosquitoes as they will sense a thermal movement that will simulate better a living being to their senses than just static thermal imaging would do.

Returning to FIGS. 2 and 3, the heat generated by burner 17 generates $CO_2$, moisture and warm air is kept within and around shroud 23 warming up certain surfaces of shroud 23. The combustion of burner 17 causes $CO_2$, moisture and air to flow, as shown by arrows 46, under shroud 23 and around receptacle 34. The hot $CO_2$ and moisture in the air forms a $CO_2$ cloud around unit 12, shown by arrows 47, that makes the environment around unit 12 attractive to mosquitoes. Fan 29 moving air through the device operates to push the $CO_2$ cloud and moisture laterally away from around the device as shown in FIG. 4.

As shown in FIG. 2, fan 29 moves air into the unit forming a vacuum effect at the openings between cover 26 and dome-shaped housing 28, which pulls or sucks mosquitoes in while they try to land over the warm external spot surfaces which provides dynamic thermal imaging on dome-shaped housing 28. Once they are sucked into the unit, the fan 29 propels them into the receptacle 34. A mesh screen at the openings of receptacle 34 keeps the mosquitoes there until they dehydrate in the middle of the outgoing airflow and eventually die.

While there has been shown and described an embodiment of the mosquito control device of the invention changes in the shape, design, structure and materials can be made by a person skilled in the art without departing from the invention.

The invention claimed is:

1. A mosquito control device comprising:
   a mosquito attracting and obliterating unit and a heat generating unit operable to supply heated air, $CO_2$ and moisture to said mosquito attracting and obliterating unit,
   a member having an open bottom connecting the heat generating unit to the mosquito attracting and obliterating unit,
   said mosquito attracting and obliterating unit including a housing mounted on the member,
   a cap located over the housing providing a passage between the cap and housing,
   a receptacle located below the open bottom of the member for collecting mosquitoes,
   an air moving apparatus operable to draw air and mosquitoes into the passage between the cap and housing and discharge the air and mosquitoes into the receptacle, said air flowing out of the receptacle into the ambient air around the receptacle,
   said member having an open bottom directing the air, $CO_2$ and moisture from the heat generating unit through the open bottom of the member to a location below the member into ambient air below the member and above the air flowing from the receptacle to the ambient air below the member to form a $CO_2$ cloud below the member whereby mosquitoes are attracted to said $CO_2$.

2. The mosquito control device of claim 1 wherein: said heat generating unit includes a gas burner operable to supply the heated air, $CO_2$ and moisture.

3. The mosquito control device of claim 1 wherein: the member includes a shroud having an outside surface exposed to ambient air heated by the flow of heated air, $CO_2$ and moisture from the heat generating unit whereby the heated shroud attracts mosquitoes called static thermal imaging, said shroud directing the flow of heated air, $CO_2$ and moisture into the surrounding environment above the air flowing out of the receptacle.

4. The mosquito control device of claim 1 wherein: the air moving apparatus includes a fan for moving air through the mosquito attracting and obliterating unit into the surrounding environment below the housing.

5. The mosquito control device of claim 1 wherein: the mosquito attracting and obliterating unit has a series of heaters located adjacent separate inside portions of the housing to establish warm spots on the housing called spot thermal imaging.

6. The mosquito control device of claim 5 including: means to turn the heaters on and off corresponding to a living being's temperature to simulate dynamic thermal imaging.

7. The mosquito control device of claim 5 wherein: the cap located over the housing has at least one opening whereby air vacuum around the cap and housing sucks air and mosquitoes into the mosquito attracting and obliterating unit.

8. The mosquito control device of claim 7 wherein: the air moving apparatus includes a fan located between the housing and the receptacle, said fan operable to push air away from the receptacle while trapping mosquitoes in the receptacle of the mosquito attracting and obliterating unit.

9. The mosquito control device of claim 8 wherein: said receptacle has a screen mesh with openings to allow the air to exit from the receptacle, while receiving and keeping all mosquitoes in the receptacle until they dehydrate and eventually die.

10. The mosquito control device of claim 7 including: at least one light located on the cap to attract mosquitoes to the area where there is a vacuum to suck mosquitoes into the mosquito attracting and obliterating unit.

11. A mosquito control device comprising:
a mosquito attracting and obliterating unit having a housing adapted to be located above a stream of heated air, $CO_2$ and moisture flowing below the housing to form with ambient air a $CO_2$ cloud in the environment around the housing that attracts mosquitoes, a shroud having an open bottom for directing the flowing heated $CO_2$ and moisture into the air environment below said housing,
a cap mounted on the housing, said cap being located above the housing providing a space between the housing and cap,
a receptacle mounted on the shroud located below the open bottom of the shroud for collecting mosquitoes,
an air moving apparatus operable to draw air and mosquitoes attracted by the $CO_2$ cloud in the air environment below the housing into the space between the housing and cap and into the receptacle with the air being dispensed from the receptacle into ambient air below said $CO_2$ cloud,
said housing providing a passage for air and mosquitoes to flow from the space between the housing and cap into the receptacle whereby mosquitoes entrained in the air are dispensed into the receptacle.

12. The mosquito control device of claim 11 wherein: the housing is a semi-hemispherical member and
the shroud is a member for directing heated $CO_2$ and moisture to the area surrounded be the semi-hemispherical member, said heated $CO_2$ and moisture flowing from the area into the air environment around and below the open bottom of the shroud and above the air flowing from the receptacle retaining the mosquitoes.

13. The mosquito control device of claim 11 including: at least one electric heater located adjacent the inside of the housing operable to provide a warm spot-on the housing that attracts mosquitoes.

14. The mosquito control device of claim 13 including: means to turn the heater on and off to control the temperature of the warm spot on the housing.

15. The mosquito control device of claim 14 including: at least one blue light mounted on the cap for attracting mosquitoes.

16. A mosquito control device comprising:
a mosquito attracting and obliterating unit mounted on a heat generating unit,
said heat generating unit having a housing and a gas burner located within the housing operable to generate a supply of heated air, $CO_2$ and moisture,
a base plate,
means mounting the housing and gas burner on the base plate,
a shroud having an open bottom mounted on the base plate and located over the gas burner whereby the flame of the gas burner heats the shroud,
said mosquito attracting and obliterating unit comprising a dome-shaped housing mounted on the shroud,
a plurality of heaters located adjacent the inside of the dome-shaped housing operable to provide warm areas on the dome-shaped housing to simulate warm areas of a living body to attract mosquitoes,
a cap mounted on the dome-shaped housing, said cap being spaced above the dome-shaped housing providing one or more openings for allowing fresh air to flow between the cap and dome-shaped housing,
a receptacle mounted on the shroud and extended below the open bottom of the shroud for collecting mosquitoes,
a fan located in the space between the dome-shaped housing and receptacle,
an electric motor connected to the fan operable to rotate the fan to draw fresh air and mosquitoes through said one or more openings into the space between the dome-shaped housing and cap,
said dome-shaped housing having a central opening providing a passage for fresh air and mosquitoes to flow from the space between the dome-shaped housing and cap into the receptacle whereby mosquitoes entrained in the fresh air flow are discharged into the receptacle, and
said receptacle including a plurality of curved blades for directing air away from the receptacle in a generally circular path around and below the open bottom of the shroud to form with ambient air a cloud of mixed air, $CO_2$ and moisture in the air environment below the open bottom of the shroud and above the air directed away from the receptacle that attracts mosquitoes, said mosquitoes being drawn by flowing vacuum air into the space between the dome-shaped housing and cap and discharge into the receptacle where the mosquitoes dehydrate and die.

17. The mosquito control device of claim 16 wherein: the shroud is includes a member having an open bottom for directing air, $CO_2$ and moisture from the gas burner to below the open bottom of the shroud and above the air flowing from the receptacle retaining the mosquitoes.

18. The mosquito control device of claim 16 including: a plurality of lights located on the cap for attracting mosquitoes.

19. The mosquito control device of claim 16 including: means to turn the heaters on and off to control the temperature of the warm spots on the dome-shaped housing.

20. A mosquito control device comprising:
a heat generating unit operable to generate a supply of heated air and carbon dioxide,
said heat generating unit including
a first housing having an internal chamber and an air outlet opening to allow air and carbon dioxide to flow out of the chamber,
a gas burner located within the internal chamber of the housing for generating a flame producing heated air and carbon dioxide,
a base member supporting the first housing and gas burner,
a shroud having an open bottom mounted on the base member located over the outlet opening of the first housing,
a mosquito attracting and obliterating unit including a second housing having an annular convex curved side wall, said side wall being mounted on the shroud, said convex curved side wall having an outside surface and inside surface, a plurality of heaters located adjacent the inside surface of the annular convex curved side wall of the second housing operable to provide warm spots on the outside surface of the annular convex curved side wall to simulate warm areas of a living body to attract mosquitoes to said outside surface of the annular convex curved side wall, said heaters being operable to turn on and off to simulate varying temperatures of a living body, a cap located above and mounted on the second housing, said cap and annular convex curved side wall being spaced from each other providing a passage to allow air and mosquitoes to flow over the annular convex curved side wall, a receptacle mounted on the shroud and extended below the open bottom of the shroud in air flow communication with said passage for collecting mosquitoes entrained in the air, a fan located between the cap and receptacle operable to move air and mosquitoes through the passage between the cap and second housing and into the receptacle and discharge air below the heated air and carbon dioxide dispensed by the gas burner whereby the heated air and carbon dioxide form a cloud of mixed air, carbon dioxide and moisture around and below the shroud for attracting mosquitoes, a motor connected to the fan operable to drive the fan, said receptacle having a member with at least one blade for directing air, carbon dioxide and moisture in a generally outward and circular path around and below the open bottom of the shroud to form with ambient air said cloud of mixed air, carbon dioxide and moisture in the air environment around and below the open bottom of the shroud of the mosquito attracting and obliterating unit whereby mosquitoes are attracted to the cloud of mixed air, carbon dioxide and moisture, said mosquitoes being drawn by flowing air into the passage between the cap and second housing and discharged into the receptacle where the mosquitoes dehydrate and die.

21. The mosquito control device of claim 20 wherein:

the shroud is a member having an open bottom directing air, carbon dioxide and moisture from the gas burner to a location below the open bottom of the shroud and above the air flowing from the receptacle retaining the mosquitoes.

22. The mosquito control device of claims 20 including:

at least one light located on the cap for attracting mosquitoes.

23. A mosquito control device comprising:

a heat generating unit including a housing and a gas burner located within the housing operable to generate a supply of heated air, $CO_2$ and moisture, a base plate, fasteners mounting the housing and gas burner on the base plate, a tubular member operatively associated with the gas burner for directing the supply of heated air, $CO_2$ and moisture in an upward direction, a shroud having top surfaces and an open bottom mounted on the base plate and located over the tubular member whereby the heated air, $CO_2$ and moisture from the tubular member heats the top surfaces of the shroud to create thermal imaging for attracting mosquitoes, a mosquito attracting and obliterating unit mounted on the shroud, said mosquito attracting and obliterating unit having a dome-shaped housing mounted on the shroud, a cap mounted on the dome-shaped housing, said cap being spaced above the dome-shaped housing providing one or more fresh air inlet openings for allowing fresh air to flow between the cap and dome-shaped housing, a receptacle mounted on the shroud and extended below the open bottom of the shroud for collecting mosquitoes, a fresh air mover operable to draw fresh air and mosquitoes through said one or more air inlet openings into the space between the dome-shaped housing and cap, and into the receptacle, said fresh air flowing out of the receptacle, at least one curved wall on the receptacle for directing fresh air flowing from the receptacle away from the receptacle in a generally circular path below the shroud, said shroud directing the heated air, $CO_2$ and moisture through the open bottom of the shroud to a location below the shroud into ambient air and above the fresh air flowing out of the receptacle to form a cloud of mixed air, $CO_2$ and moisture below the shroud.

24. The mosquito control device of claim 23 including:

at least one heater located adjacent an inside portion of the dome-shaped housing and a control operatively associated with the heater to turn the heater on and off to create dynamic thermal imaging for attracting mosquitoes.

\* \* \* \* \*